(12) United States Patent
Niitsuma et al.

(10) Patent No.: US 8,562,074 B2
(45) Date of Patent: Oct. 22, 2013

(54) VEHICLE SEAT

(71) Applicants: TS Tech Co., Ltd., Saitama (JP); Honda Giken Kogyo Kabushiki Kaisha, Tokyo (JP)

(72) Inventors: Kenichi Niitsuma, Tochigi-ken (JP); Hirooki Negishi, Tochigi-ken (JP); Jinichi Tanabe, Tochigi-ken (JP); Koji Sano, Saitama-ken (JP); Koji Uno, Saitama-ken (JP); Tatsuya Terauchi, Saitama-ken (JP); Tomoki Matsumoto, Saitama-ken (JP)

(73) Assignees: TS Tech Co., Ltd., Saitama (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/682,236

(22) Filed: Nov. 20, 2012

(65) Prior Publication Data
US 2013/0082496 A1 Apr. 4, 2013

Related U.S. Application Data

(62) Division of application No. 13/361,142, filed on Jan. 30, 2012, now Pat. No. 8,322,786, which is a division of application No. 13/077,325, filed on Mar. 31, 2011, now Pat. No. 8,104,831, which is a division of application No. 12/279,766, filed as application No. PCT/JP2005/013468 on Jul. 22, 2005, now Pat. No. 8,020,930.

(51) Int. Cl.
*B60N 2/42* (2006.01)
*B60N 2/427* (2006.01)

(52) U.S. Cl.
USPC .................................................. 297/216.12

(58) Field of Classification Search
USPC .................................................... 297/216.12
See application file for complete search history.

(56) References Cited

U.S. PATENT DOCUMENTS

| | | | | |
|---|---|---|---|---|
| 4,632,454 | A * | 12/1986 | Naert | 297/284.4 |
| 5,076,643 | A * | 12/1991 | Colasanti et al. | 297/284.6 |
| 6,139,102 | A * | 10/2000 | von Moller | 297/284.4 |
| 6,250,714 | B1 * | 6/2001 | Nakano et al. | 297/216.12 |
| 6,260,921 | B1 * | 7/2001 | Chu et al. | 297/284.4 |
| 6,375,262 | B1 * | 4/2002 | Watanabe | 297/216.12 X |
| 6,568,753 | B1 * | 5/2003 | Watanabe | 297/216.12 |
| 6,702,377 | B2 * | 3/2004 | Nakano | 297/216.12 |

(Continued)

FOREIGN PATENT DOCUMENTS

| | | |
|---|---|---|
| DE | 100 46 391 C1 | 4/2002 |
| DE | 102 12 828 C1 | 6/2003 |

(Continued)

*Primary Examiner* — Rodney B White
(74) *Attorney, Agent, or Firm* — Drinker Biddle & Reath LLP

(57) ABSTRACT

A vehicle seat is provided comprising a seat back frame having right and left side frames, a headrest for supporting a head of a seat occupant, and a back-and-forth movable plate member provided inside a backrest that is positioned at a rear of the seat occupant, wherein a backward movement of the plate reduces a distance between the head of the seat occupant and the headrest. The plate is attached to each side frame through a link member and a link support shaft swingably supports the link member. A bracket member that supports the link support shaft and is attached to the side frame.

36 Claims, 6 Drawing Sheets

(56) References Cited

U.S. PATENT DOCUMENTS

| | | | |
|---|---|---|---|
| 6,783,177 B1 * | 8/2004 | Nakano | 297/216.12 |
| 6,789,845 B2 * | 9/2004 | Farquhar et al. | 297/216.12 |
| 6,918,633 B2 * | 7/2005 | Forkel et al. | 297/284.4 |
| 6,955,397 B1 * | 10/2005 | Humer | 297/216.12 |
| 7,044,544 B2 * | 5/2006 | Humer et al. | 297/216.12 |
| 7,052,087 B2 * | 5/2006 | McMillen | 297/284.4 |
| 7,077,472 B2 * | 7/2006 | Steffens, Jr. | 297/216.12 X |
| 7,104,602 B2 * | 9/2006 | Humer et al. | 297/216.12 |
| 7,270,374 B2 * | 9/2007 | Moriggi | 297/284.4 |
| 7,393,052 B2 * | 7/2008 | Humer et al. | 297/216.12 |
| 7,644,987 B2 * | 1/2010 | Humer et al. | 297/216.12 |
| 8,020,930 B2 * | 9/2011 | Niitsuma et al. | 297/216.12 |
| 8,104,831 B2 * | 1/2012 | Niitsuma et al. | 297/216.12 |
| 8,322,786 B2 * | 12/2012 | Niitsuma et al. | 297/216.12 |
| 8,434,818 B2 * | 5/2013 | Humer et al. | 297/216.12 |
| 2004/0155496 A1 * | 8/2004 | Farquhar et al. | 297/216.12 |
| 2006/0006709 A1 * | 1/2006 | Uno et al. | 297/216.12 |
| 2009/0001785 A1 * | 1/2009 | Swan et al. | 297/216.12 |

FOREIGN PATENT DOCUMENTS

| | | |
|---|---|---|
| JP | 7-75608 A | 3/1995 |
| JP | 10-119619 A | 5/1998 |
| JP | 10-138811 A | 5/1998 |
| JP | 10-138812 A | 5/1998 |
| JP | 10-138814 A | 5/1998 |
| JP | 11-034708 A | 2/1999 |
| JP | 11-192869 A | 7/1999 |
| JP | 11-206506 A | 8/1999 |
| JP | 2000-201769 A | 7/2000 |
| JP | 2000-210157 A | 8/2000 |
| JP | 2000-211410 A | 8/2000 |
| JP | 2003-341401 A | 12/2003 |

* cited by examiner

US 8,562,074 B2

VEHICLE SEAT

CROSS-REFERENCE TO RELATED APPLICATIONS

This application is a divisional application of U.S. patent application Ser. No. 13/361,142, filed Jan. 30, 2012, now U.S. Pat. No. 8,322,786 B2, which is a divisional application of U.S. patent application Ser. No. 13/077,325, filed Mar. 31, 2011, now U.S. Pat. No. 8,104,831 B2, which is a divisional application of U.S. patent application Ser. No. 12/279,766, filed Jun. 18, 2009, now U.S. Pat. No. 8,020,930 B2, which is a PCT national stage entry of international patent application no. PCT/JP2005/13468, filed Jul. 22, 2005. The contents of these applications are herein incorporated by reference.

BACKGROUND

The present invention relates to a coupling mechanism for a headrest of a vehicle seat, and more particularly to a coupling mechanism for moving the headrest forward when a forward external force acts on a car body as a result of rear end collisions or the like.

Conventionally, there is known from Japanese Patent Application Laid-Open No. 10-119619 a vehicle seat having a headrest provided in a backrest, a movable member provided inside of the backrest, and a coupling mechanism for coupling the headrest and the movable member mechanically, in which, when a vehicle seat occupant moves backward relative to the vehicle seat due to rear collisions or the like, the movable member is pushed by the occupant to move backward, and the backward movement of the movable member moves the headrest forward by way of the coupling mechanism.

The coupling mechanism of the prior art is disposed substantially at the backside of a cushion of the backrest, and thus the cushion performance may be lowered. That is, the coupling mechanism is provided at a position overlapping the vehicle seat occupant in the front-to-back direction, and thus the cushion design is restricted.

The movable member in the prior art is narrow in its movable range, and the distance of moving the headrest forward is short, and means for compensating for lack of distance is difficult.

SUMMARY

It is hence an object of embodiments of the invention to provide a coupling mechanism for a headrest capable of amplifying the small moving amount of the movable member and transmitting the movement to the headrest. It is another object of embodiments of the invention to provide a coupling mechanism for a headrest capable of amplifying the moving amount of the movable member with a simple configuration. It is still another object of the invention to provide a coupling mechanism for a headrest not interfering with the cushion of the backrest substantially.

Therefore, a vehicle seat is provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward in at least an end part in a vertical direction, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with first and second backward protrusions protruding backward, and the first and second backward protrusions extend laterally and are arranged in parallel with each other.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member, provided with a first backward protrusion protruding backward in an upper end part thereof, and provided with a second backward protrusion protruding backward in a lower end part thereof, and the first and second backward protrusions extend laterally.

BRIEF DESCRIPTION OF THE DRAWINGS

An embodiment of the invention is shown in the following figures.

DETAILED DESCRIPTION

Figure 1:
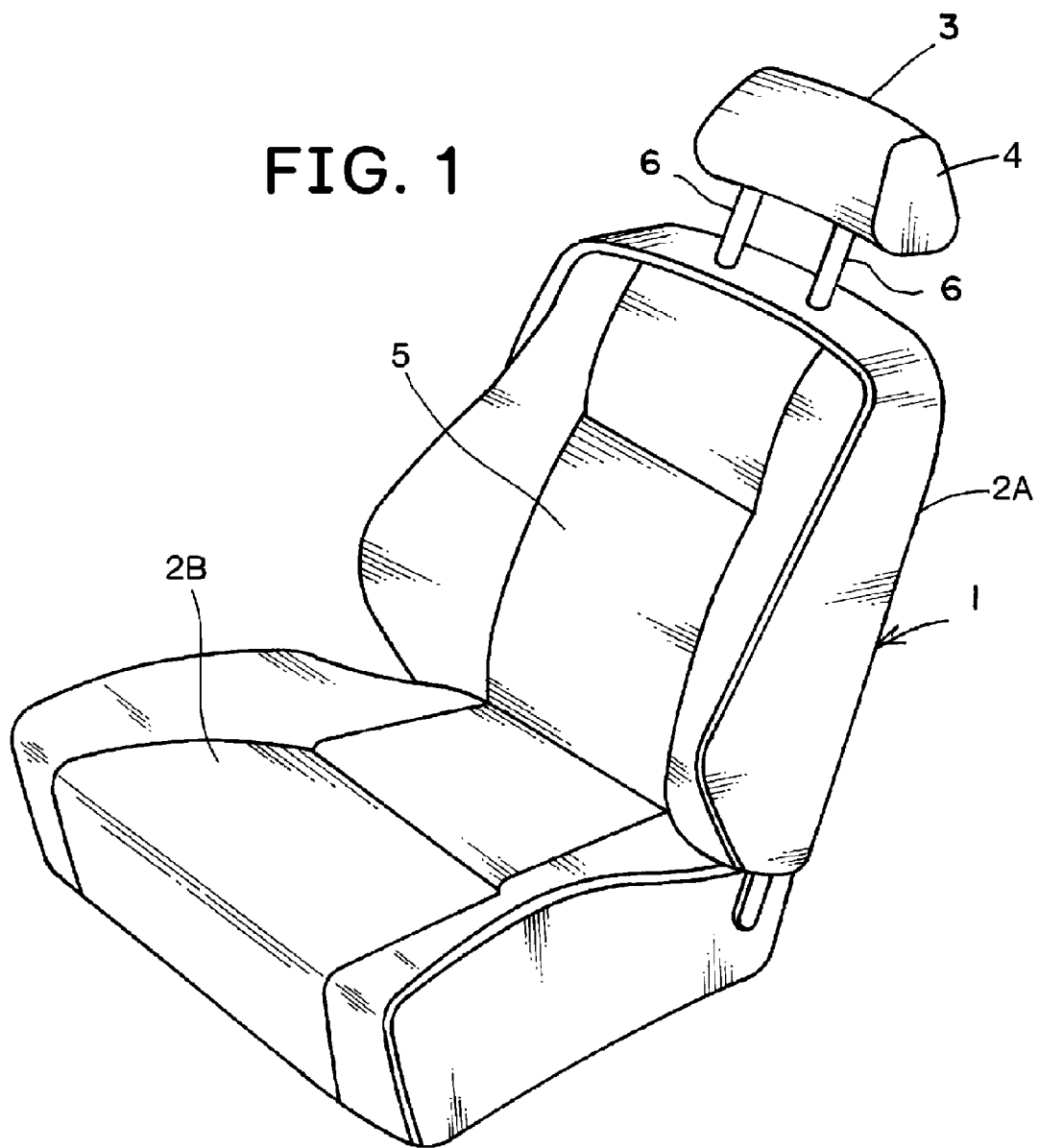
FIG. 1 is an overall perspective view of a vehicle seat.

An embodiment of the invention will be described with reference to the accompanying drawings. A vehicle seat 1 of the invention has a backrest 2A, a seat bottom 2B, and a headrest 3 having a head support 4 is provided in an upper part of the backrest 2A. A backrest frame 16 of the backrest 2A has a square frame shape, including a pair of side frames 40, each having an inward extension 40a and outwardly recessed portion 50, an upper frame 41, and a lower frame 42.

Near the upper frame 41, an upper movable member 10 (headrest support member) movable laterally to the backrest frame 16 is disposed. Vertical pillar supports 11 for inserting the lower parts of pillars 6 of the headrest 3 are fixed in the movable member 10. The pillars 6 are supported by the pillar supports 11 to be adjustable in height. The movable member 10 also has an outward extension 12a, and a forward extension 12b, as well as a protrusion 14 having an anteroposterior extension, and a forward bent portion 14a.

Figure 2:
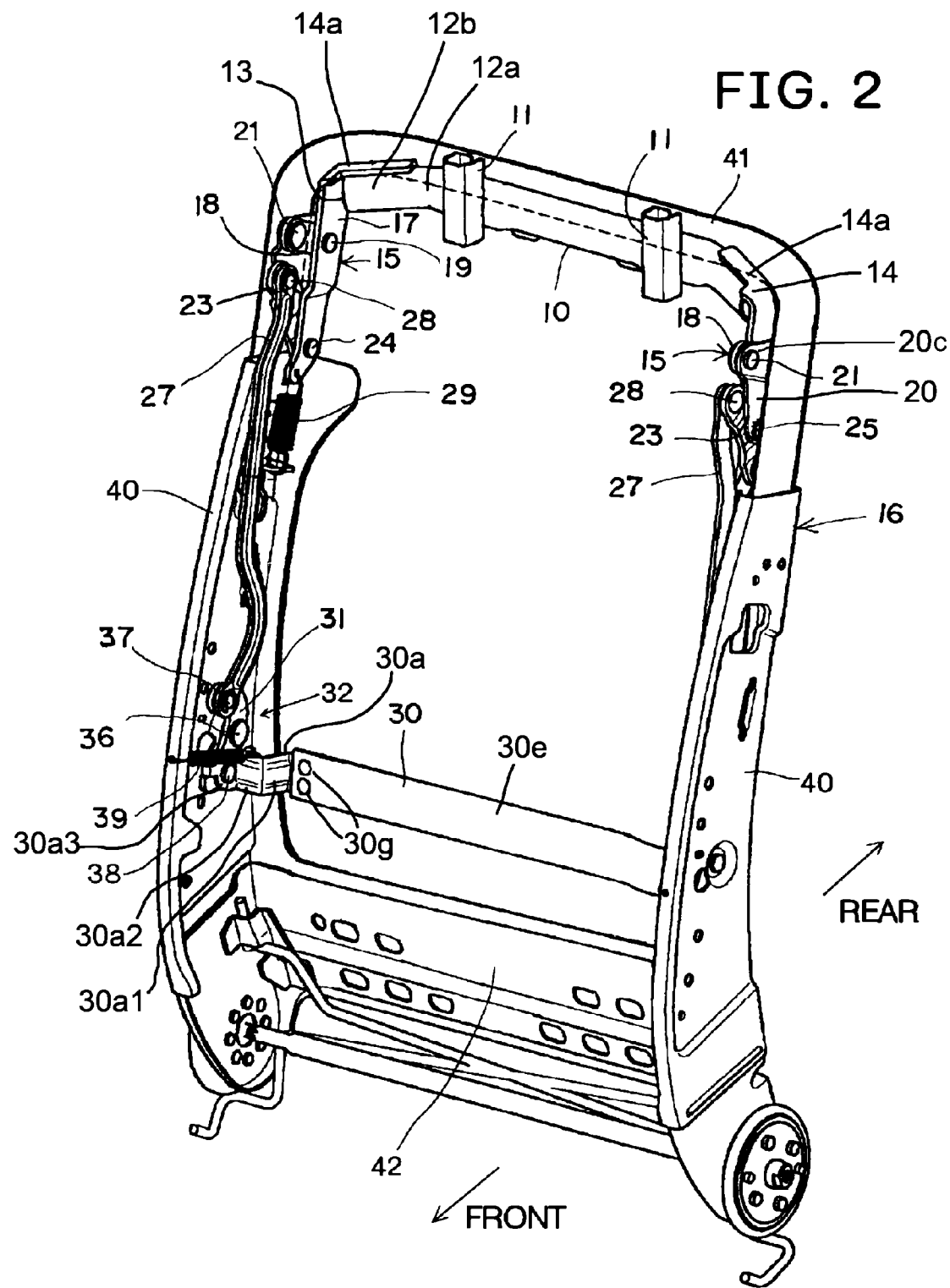
FIG. 2 is a perspective view showing a backrest frame and a part of a coupling mechanism for a headrest.
Figure 3:
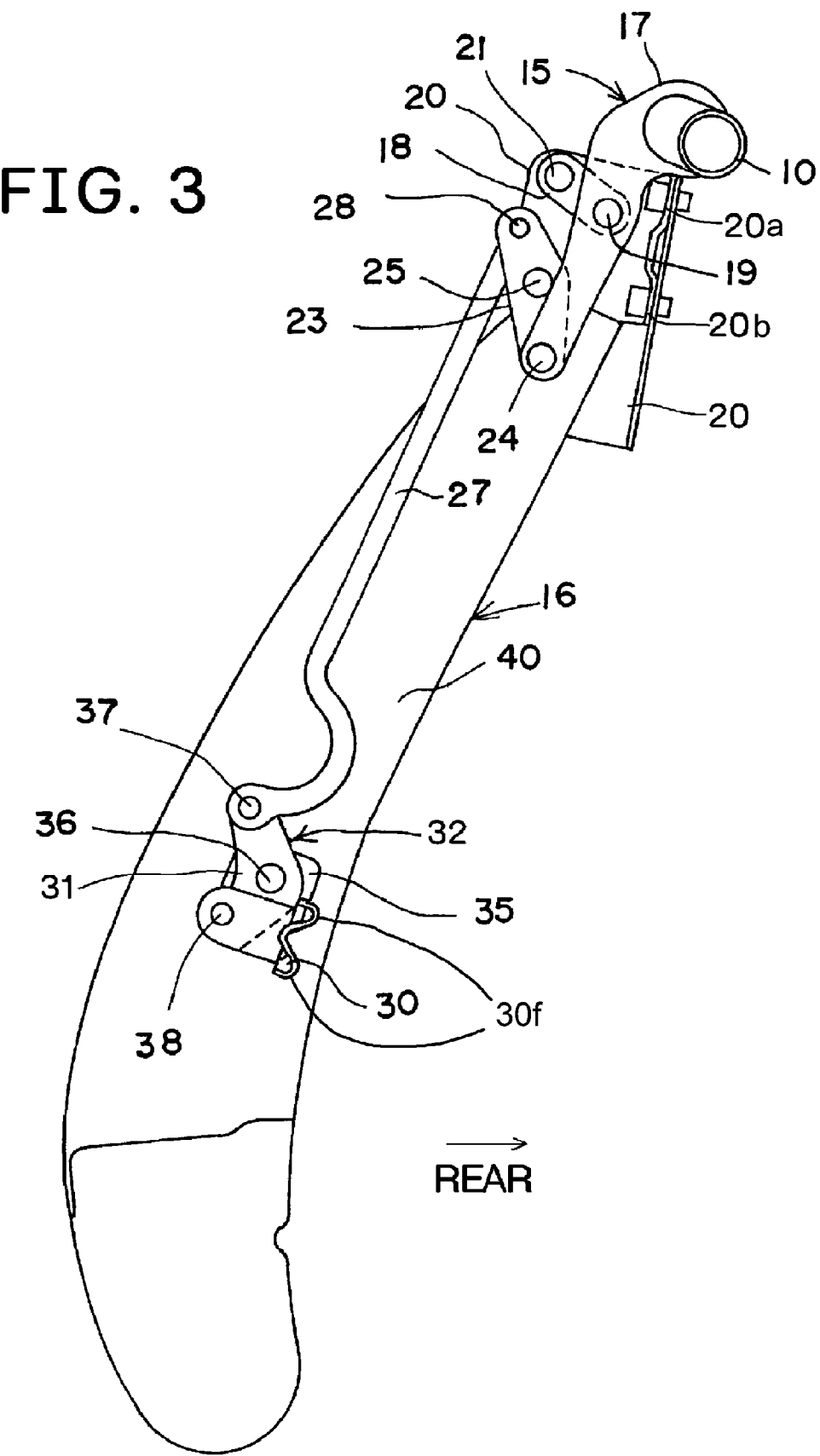
FIG. 3 is a side view of the coupling mechanism for a headrest.
Figure 4:
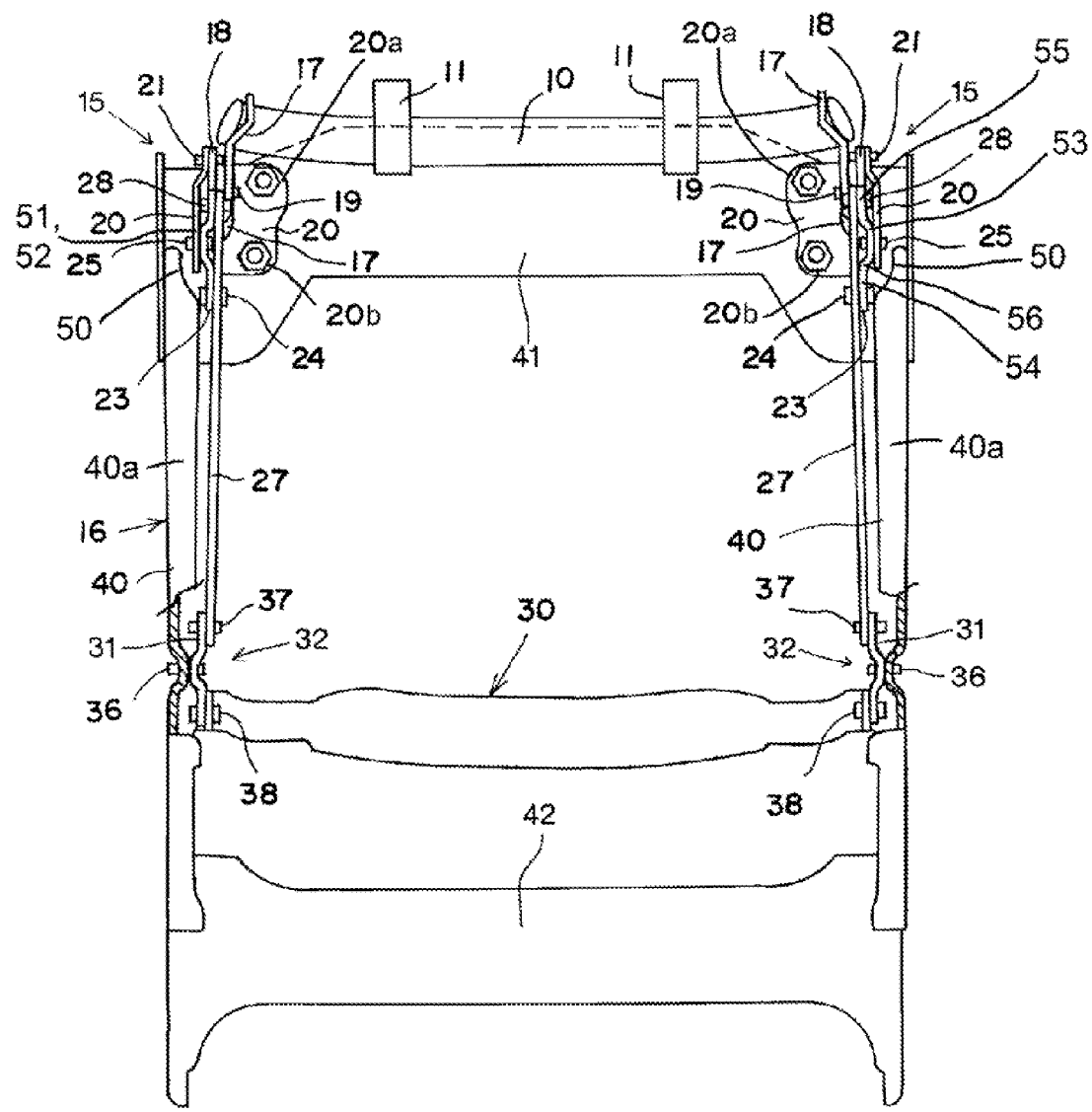
FIG. 4 is a front view of the backrest frame and the coupling mechanism for a headrest.
Figure 7:
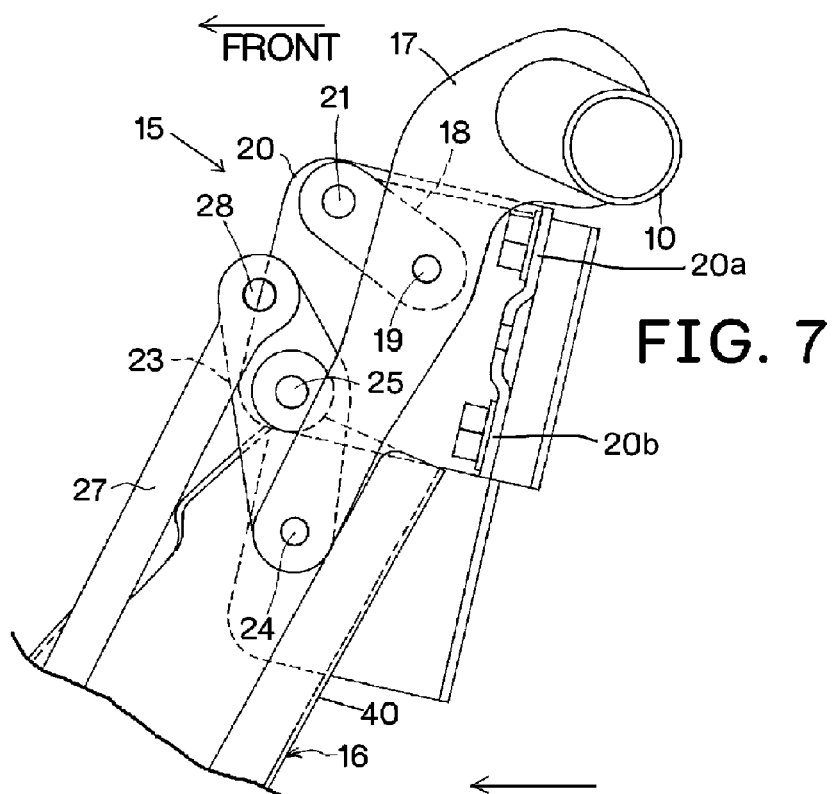
FIG. 7 is a magnified side view of an upper link mechanism of the coupling mechanism.

Both right and left sides of the upper movable member 10 are attached to the backrest frame 16 by way of an individual upper link mechanism 15. Each upper link mechanism 15 has a long first link 17 (downward extension, lateral portion of headrest support member), an arm 18 (second link member), and a second link 23 (first link member) as shown in FIGS. 2, 3 and 7. The end part of the upper movable member 10 is fixed to an upper part of the first link 17, and the arm 18 is rotatably pivoted on an L-shaped bracket 20 (or a bracket, bracket member, or upper bracket), having upper 20a and lower 20b fixing portions, fixed in the upper part of the backrest frame 16 by way of a shaft 21 (second link support shaft), and having a link support portion 20c. An intersection 13 exists between the first link 17 and the forward extension 12b. The second link 23 is rotatably pivoted on the bracket 20 by way of a shaft 25 (first link support shaft). The leading end of the arm 18 is pivoted on the vertical intermediate position of the first link 17 by way of a shaft 19 (second coupling shaft), and the leading end of the second link 23 is pivoted on the lower part of the first link 17 by way of a shaft 24 (first coupling shaft). The other end of the second link 23 is pivoted on the upper part of a long coupling rod 27 (transmission member) by way of a shaft 28. The bracket 20 has a link support portion 51 with a link support surface 52. The second link 23 has a bracket attachment 53, a first extension 54 and a second extension 55. The second link 23 also has a bent portion 56.

The first link 17, the arm 18 and the second link 23 of the upper link mechanism 15 are preliminarily assembled in, preferably, the bracket 20. As a result, the bracket provided with the link mechanism can be easily assembled in the backrest frame 16 as a unit module. The bracket provided with the link mechanism makes it easy to manage storage parts, and to replace parts in maintenance operations.

Figure 6:
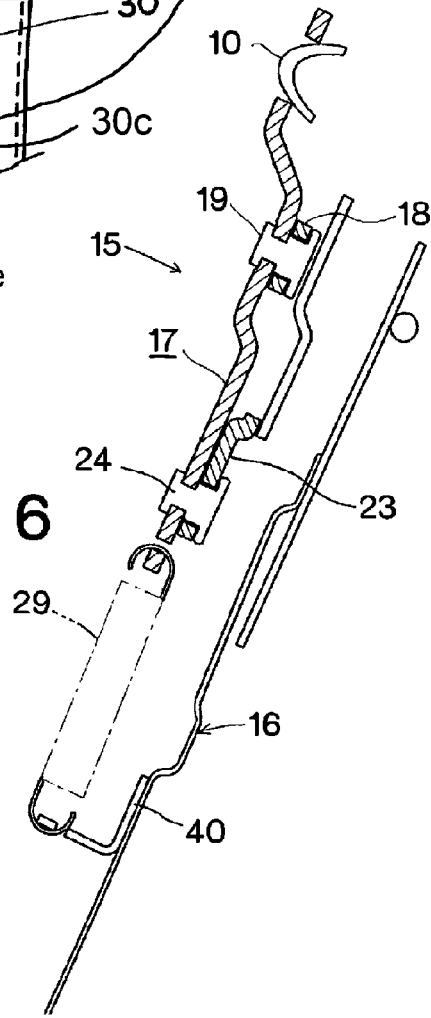
FIG. 6 is a sectional view of a first link of the coupling mechanism.

As shown in FIGS. 2 and 6, one end of an upper spring 29 is coupled to the lower part of the first link 17, and the other end of the upper spring 29 is coupled to the side frame 40. The first link 17 is usually held at a lower waiting position in FIG. 7 by an elastic force of the spring 29, and hence the headrest 3 is held at an ordinary position. When the first link 17 moves up to a position indicated by solid line in FIG. 8, the upper movable member 10 moves forward, and the headrest 3 is forced out forward.

Between the side frames 40, 40, a lower movable member 30 (a movable plate member), which may be a back-and-forth movable body or a sensing member, stretching laterally is disposed. The lower movable member 30 is pushed by a vehicle seat occupant and moved backward when the vehicle seat relatively moves forward of the occupant due to a rear end collision. Both sides of the lower movable member 30 are coupled to the ends of the lower link 31 (link member) of the lower link mechanism 32 by way of shafts 38 (coupling shafts). The lower movable member 30 comprises a plate-shaped portion 30e that connects to the shaft 38 via a coupling plate member 30a (also called a coupling member or end extension) through a first (or first forward) extension 30a1, second (or outward) extension 30a2, and third (or anteroposterior) extension 30a3 (or forward extending portion). The forward extending portion 30a3 comprises a front bent portion 30a3.1 that is formed at its front end. The forward extension 30a1 comprises an elongated (or through) hole 30a4. The lower movable member 30 also comprises a shaft member 30g. The other end of the lower link 31 is coupled to the lower part of the coupling rod 27 (transmission member) by way of a shaft 37. The lower link 31 is preferably a bell crank. The center of the lower link 31 is pivoted on a lower bracket 35 (bracket member), having upper (or first) 35a and lower (or second) 35b fixing portions, fixed to the side frame 40 by way of a shaft 36 (link support shaft). The bracket member may also have an inward protruding surface 35c, a front fixing portion (or first attachment portion) 35d, and a rear fixing portion (or second attachment portion) 35e.

As shown in FIG. 2, one end of the lower spring 39 is coupled to the lower movable member 30, and the other end of the lower spring 39 is coupled to the side frame 40. The lower movable member 30 is held at a forward ordinary position by the elastic force of the spring 39, and when a rear end collision occurs, it is pushed by the vehicle seat occupant and moved backward by resisting the elastic force of the spring 39.

Figure 5:
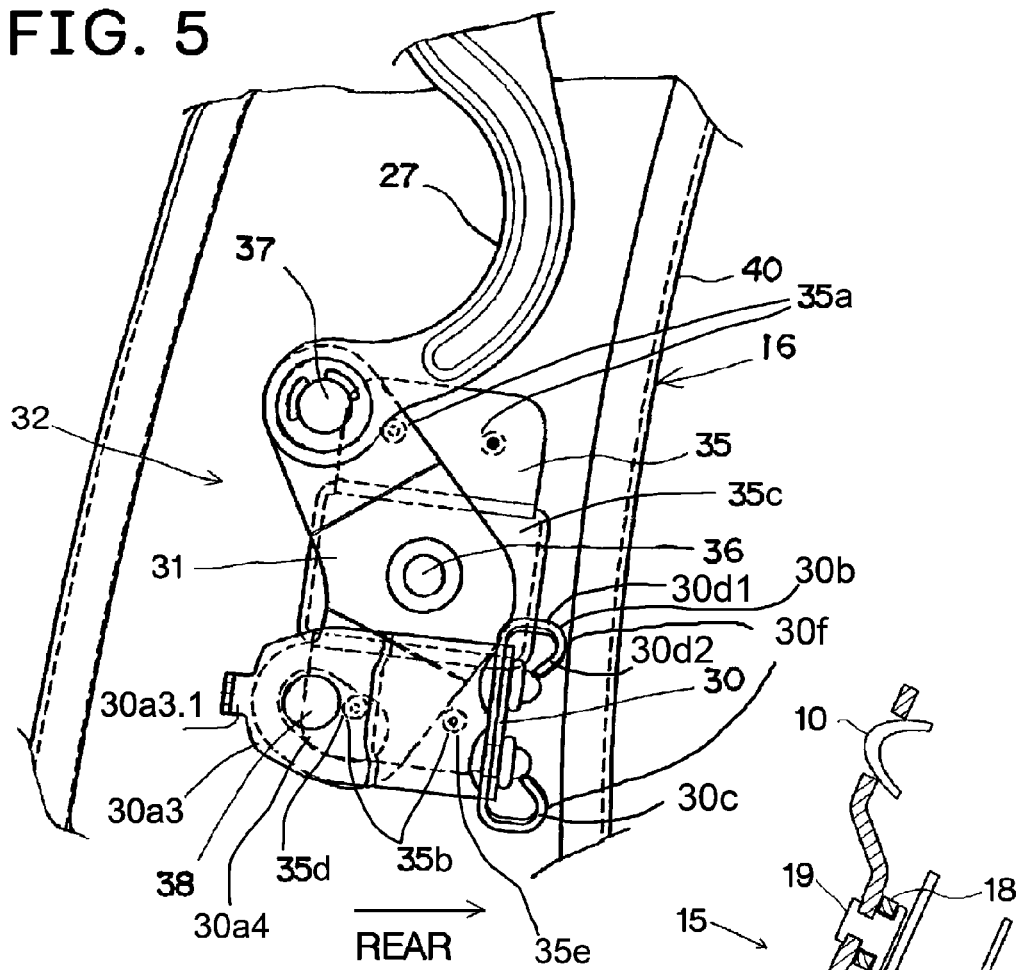
FIG. 5 is a magnified side view of a lower link mechanism of the coupling mechanism.
Figure 8:
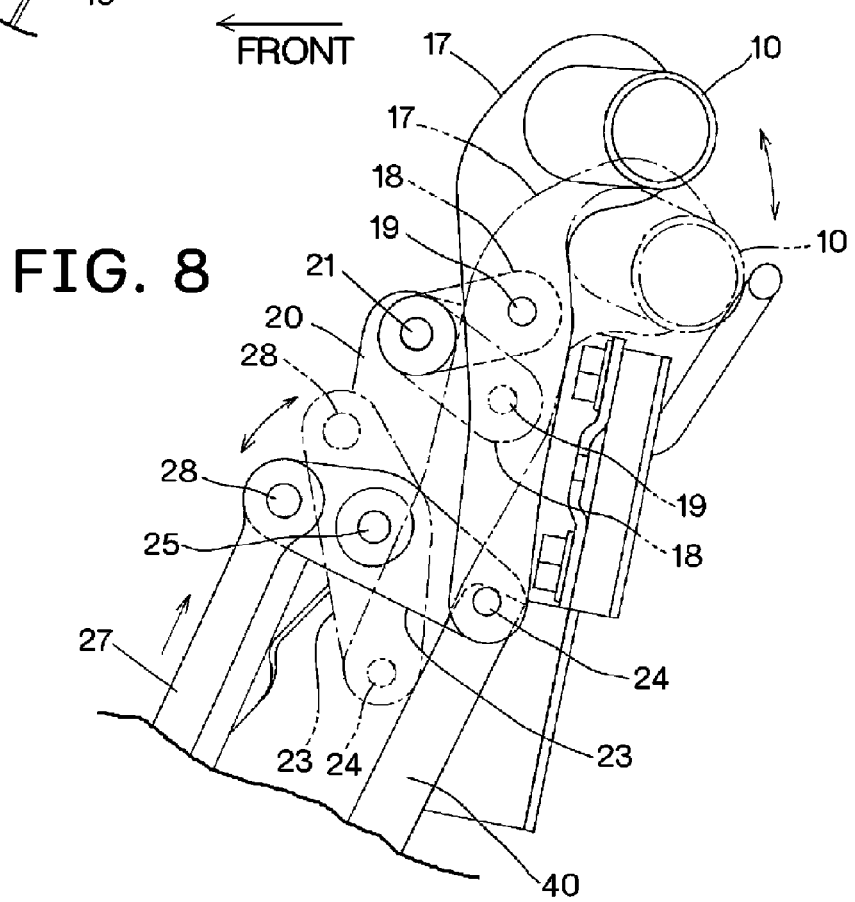
FIG. 8 is a magnified side view showing the first link elevated from the state in FIG. 7.

In FIGS. 3 and 5, the backward movement of the lower movable member 30 causes the lower link 31 to rotate counterclockwise about the shaft 36, and causes the coupling rod 27 to be pulled downward. As a result, the second link 23 rotates counterclockwise about the shaft 25, and moves the first link 17 upward by resisting the elastic force of the upper spring 29. At this time, the distance between the shaft 25 and shaft 28 is shorter than the distance between the shaft 25 and shaft 24. Thus, the second link 23 amplifies the moving amount of the coupling rod 27 (lower movable member 30) to transmit the movement to the first link 17, the upper part of the first link 17 is guided by the arm 18 and moved substantially forward as shown in FIG. 8, and thereby the headrest 3 is moved forward by way of the upper movable member 10 so that a cervical spine of the vehicle seat occupant is protected in the event of a rear end collision.

Thus, the upper link mechanism 15 of this embodiment of the invention has a function of moving the headrest 3 largely forward with a small moving amount of the lower movable member 30. The lower movable member 30 comprises backward protrusions 30f. The backward protrusions 30f may comprise a first backward protrusion 30b (upper backward protrusion, first turn-back portion) and a second backward protrusion 30c (lower backward protrusion, second turn-back portion). These each may comprise a first (or backward) bent portion 30d1 and a second (or forward) bent portion 30d2.

The side frame 40 of the backrest frame 16 is formed of a metal plate having a specified width in the front-to-back direction, and the upper link mechanism 15, coupling rod 27, and lower link 31 are disposed adjacent to the side frame 40. In addition, the members of the upper link mechanism 15 and the lower link 31 are formed of plates substantially parallel to the side frame 40, and are supported by the shaft in the lateral direction. The upper movable member 10 substantially overlaps with the upper frame 41 of the backrest frame 16. Therefore, the mechanism for transmitting the movement of the lower movable member 30 to the headrest 3 does not substantially interfere with the cushion 5 of the backrest 2A. Hence, the transmission mechanism is operated smoothly, and decline of performance of the cushion 5 is prevented.

TABLE OF REFERENCE CHARACTERS 1 vehicle seat
2A backrest 2B seat bottom
3 headrest
4 head support
5 cushion
6 pillars
10 upper movable member; headrest support member
11 pillar supports
12a outward extension
12b forward extension
13 intersection
14 protrusion
14a anteroposterior extension; forward bent portion
15 upper link mechanism
16 backrest frame
17 long first link; downward extension; lateral portion of headrest support member
18 arm; second link member
19 shaft; second coupling shaft
20 L-shaped bracket; bracket; bracket member; upper bracket
20a,b upper and lower fixing portions of bracket member
20c bracket member link support portion
21 shaft; second link support shaft
23 second link; first link member
24 shaft; first coupling shaft
25 shaft; first link support shaft
27 long coupling rod; transmission member
28 shaft
29 upper spring
30 lower movable member; back-and-forth movable body; sensing member; movable plate member
30a coupling plate member; coupling member; end extension
30a1 first extension; forward extension
30a2 second extension; outward extension
30a3 third extension; anteroposterior extension; forward extending portion
30a3.1 front bent portion
30a4 forward extension elongated hole; through hole
30b first backward protrusion; upper backward protrusion; first turn-back portion
30c second backward protrusion; lower backward protrusion; second turn-back portion
30d1 first bent portion; backward bent portion
30d2 second bent portion; forward bend portion
30e plate shaped portion
30f backward protrusion
30g shaft member
31 lower link; bell crank; link member
32 lower link mechanism
25 lower bracket; bracket member
35a upper fixing portion of bracket member; first fixing portion of bracket member
35b lower fixing portion of bracket member; second fixing portion of bracket member
35c inward protruding surface of bracket member
35d front fixing portion of bracket member; first attachment portion of bracket member
35e rear fixing portion of bracket member; second attachment portion of bracket member
36 shaft; link support shaft
37 shaft
38 shaft; coupling shaft
39 spring
40 side frame
40a inward extension
41 upper frame
42 lower frame
50 outwardly recessed portion
51 link support portion
52 link support surface
53 bracket attachment
54 first extension
55 second extension
56 bent portion

What is claimed is:

1. A vehicle seat comprising:
   a side frame constituting a backrest;
   a headrest for supporting a head of a seat occupant;
   a movable plate member that is provided inside the backrest and disposed at a rear of the seat occupant, and is movable backward in response to a load from the seat occupant, wherein a backward movement of the movable plate member reduces a distance between the head of the seat occupant and the headrest;
   a link member that attaches the movable plate member to the side frame therethrough;
   a link support shaft that swingably supports the link member; and
   a bracket member that supports the link support shaft and is attached to the side frame;
   wherein:
   at least a part of the movable plate member and the bracket member are disposed in a first horizontal plane;
   the movable plate member is provided with a through-hole; and
   at least a part of the bracket member and the through-hole are disposed in a second horizontal plane.

2. The vehicle seat according to claim 1, wherein at least a part of the through-hole is disposed below an upper end of the bracket member.

3. The vehicle seat according to claim 1, wherein at least a part of the through-hole is disposed below the link support shaft.

4. The vehicle seat according to claim 1, wherein:
   each of right and left end portions of the movable plate member is connected to a respective lower end portion of the link member via a coupling shaft; and
   at least a part of the through-hole is disposed below a third horizontal plane passing through a shaft center of the link support shaft and above a fourth horizontal plane passing through a lower end of the link member.

5. The vehicle seat according to claim 1, wherein:
   each of right and left end portions of the movable plate member is connected to a respective lower end portion of the link member via a coupling shaft; and
   at least a part of the through-hole is disposed below a third horizontal plane passing through a shaft center of the link support shaft and above a fifth horizontal plane passing through a shaft center of the coupling shaft.

6. The vehicle seat according to claim 1, wherein the through-hole is of an elongate form.

7. The vehicle seat according to claim 1, wherein the through-hole is of an elongate form elongated in an up-to-down direction.

8. A vehicle seat comprising:
   a side frame constituting a backrest;
   a headrest for supporting a head of a seat occupant;
   a movable plate member that is provided inside the backrest and disposed at a rear of the seat occupant, and is movable backward in response to a load from the seat occupant, wherein a backward movement of the movable plate member reduces a distance between the head of the seat occupant and the headrest;
   a link member that attaches the movable plate member to the side frame therethrough;

a link support shaft that swingably supports the link member; and a bracket member that supports the link support shaft and is attached to the side frame;

wherein:

at least a part of the movable plate member and the bracket member are disposed in a first horizontal plane;

each of right and left end portions of the movable plate member is provided with a respective forward extending portion that extends forward;

each of the forward extending portions is provided with a through-hole; and at least a part of the bracket members and the through-holes are disposed in a second horizontal plane.

9. The vehicle seat according to claim 8, wherein the through-hole and the bracket member are disposed in an overlapped manner in a right-to-left direction.

10. The vehicle seat according to claim 8, wherein the through-hole and at least a part of a fixing portion by which the bracket member is attached to the side frame are disposed in an overlapped manner in a right-to-left direction.

11. The vehicle seat according to claim 8, wherein at least a part of each of the through-holes is disposed below an upper end of the bracket member.

12. The vehicle seat according to claim 8, wherein at least a part of each of the through-holes is disposed below the link support shaft.

13. The vehicle seat according to claim 8, wherein the through-holes are of an elongate form.

14. The vehicle seat according to claim 8, wherein each of the through-holes is of an elongate form elongated in an up-to-down direction.

15. The vehicle seat according to claim 8, wherein:

a front portion of each of the forward extending portions is connected to a lower end portion of the respective link member via a respective coupling shaft; and at least a part of each of the through-holes is disposed below a third horizontal plane passing through a shaft center of the link support shafts and above a fourth horizontal plane passing through a lower end of the link members.

16. The vehicle seat according to claim 8, wherein:

a front portion of each of the forward extending portions is connected to a lower end portion of the respective link member via a respective coupling shaft; and at least a part of the through-holes is disposed below a third horizontal plane passing through a shaft center of the link support shafts and above a fifth horizontal plane passing through a shaft center of the coupling shafts.

17. The vehicle seat according to claim 8, wherein:

each of the forward extending portion is connected to a respective lower end portion of the link member via a respective coupling shaft; and a rear end of the through-holes is disposed posterior to the coupling shafts.

18. The vehicle seat according to claim 8, wherein:

a front bent portion is formed at a front end of each of the forward extending portions; and the front bent portions and the through-holes are disposed in a sixth horizontal plane.

19. A vehicle seat comprising:

a side frame constituting a backrest;

a headrest for supporting a head of a seat occupant;

a movable plate member that is provided inside the backrest and disposed at a rear of the seat occupant, and is movable backward in response to a load from the seat occupant, wherein a backward movement of the movable plate member reduces a distance between the head of the seat occupant and the headrest;

a link member that attaches the movable plate member to the side frame therethrough;

a link support shaft that swingably supports the link member; and a bracket member that supports the link support shaft and is attached to the side frame;

wherein:

at least a part of the movable plate member and the bracket member are disposed in a first horizontal plane;

the movable plate member is provided with a through-hole;

a first turn-back portion is provided at an upper end of the movable plate member;

a second turn-back portion is provided at a lower end of the movable plate member;

the through-hole is disposed below a seventh horizontal plane passing through the first turn-back portion and above an eighth horizontal plane passing through the second turn-back portion; and at least a part of the bracket member and the through-hole are disposed in a second horizontal plane.

20. The vehicle seat according to claim 19, wherein the through-hole and the bracket member are disposed in an overlapped manner in a right-to-left direction.

21. The vehicle seat according to claim 19, wherein the through-hole and at least a part of a fixing portion by which the bracket member is attached to the side frame are disposed in an overlapped manner in a right-to-left direction.

22. The vehicle seat according to claim 19, wherein at least a part of the through-hole is disposed below an upper end of the bracket member.

23. The vehicle seat according to claim 19, wherein at least a part of the through-hole is disposed below the link support shaft.

24. The vehicle seat according to claim 19, wherein:

each of right and left end portions of the movable plate member is connected to a respective lower end portion of the link member via a respective coupling shaft; and at least a part of the through-hole is disposed below a third horizontal plane passing through a shaft center of the link support shaft and above a forth horizontal plane passing through a lower end of the link member.

25. The vehicle seat according to claim 19, wherein:

each of right and left end portions of the movable plate member is connected to a respective lower end portion of the link member via a respective coupling shaft; and at least a part of the through-hole is disposed below a third horizontal plane passing through a shaft center of the link support shaft and above a fifth horizontal plane passing through a shaft center of the coupling shaft.

26. The vehicle seat according to claim 19, wherein the through-hole is of an elongate form.

27. The vehicle seat according to claim 19, wherein the through-hole is of an elongate form elongated in an up-to-down direction.

28. The vehicle seat according to claim 19, wherein the first turn-back portion comprises a backward bent portion that is bent backward and a forward bent portion that is bent forward.

29. The vehicle seat according to claim 28, wherein the through-hole is disposed below the backward bent portion and the forward bent portion, and above a lower end of the bracket member.

30. The vehicle seat according to claim 28, wherein the backward bent portion and the forward bent portion are continuously formed.

31. The vehicle seat according to claim 30, wherein the backward bent portion, the forward bent portion and the second turn-back portion are disposed in a same vertical plane.

32. The vehicle seat according to claim 19, wherein the through-hole and a fixing portion by which the bracket member is attached to the side frame are disposed in a ninth horizontal plane.

33. The vehicle seat according to claim 19, wherein:
the bracket member is fixed to the side frame by an upper fixing portion and a lower fixing portion; and
the lower fixing portion and the through-hole are disposed in a ninth horizontal plane.

34. The vehicle seat according to claim 8, wherein:
the bracket member is fixed to the side frame by an upper fixing portion and a lower fixing portion; and
at least a part of the forward extending portion and the bracket member are disposed in a tenth horizontal plane at a position below the upper fixing portion and above the lower fixing portion.

35. The vehicle seat according to claim 1, wherein the through-hole and the bracket member are disposed in an overlapped manner in a right-to-left direction.

36. The vehicle seat according to claim 1, wherein the through-hole and at least a part of a fixing portion by which the bracket member is attached to the side frame are disposed in an overlapped manner in a right-to-left direction.

* * * * *